(12) United States Patent
Rodriguez-Herrera et al.

(10) Patent No.: US 10,313,034 B2
(45) Date of Patent: Jun. 4, 2019

(54) MASSIVE MIMO ARRAY TESTING USING A PROGRAMMABLE PHASE MATRIX AND CHANNEL EMULATOR

(71) Applicant: Spirent Communications, Inc., San Jose, CA (US)

(72) Inventors: Alfonso Rodriguez-Herrera, Denton, TX (US); John Douglas Reed, Arlington, TX (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 15/782,769

(22) Filed: Oct. 12, 2017

(65) Prior Publication Data

US 2019/0115989 A1   Apr. 18, 2019

(51) Int. Cl.
*H04B 17/21* (2015.01)
*H04B 17/391* (2015.01)
*H04B 17/00* (2015.01)
*H04B 7/0413* (2017.01)

(52) U.S. Cl.
CPC ......... *H04B 17/391* (2015.01); *H04B 7/0413* (2013.01); *H04B 17/0087* (2013.01)

(58) Field of Classification Search
CPC .... H04B 17/391; H04B 7/0413; H04B 17/12; H04B 17/0087; H04B 17/3911
See application file for complete search history.

(56) References Cited

U.S. PATENT DOCUMENTS

| | | |
|---|---|---|
| 5,548,820 A | 8/1996 | Victorin |
| 6,236,363 B1 | 5/2001 | Robbins et al. |
| 6,349,218 B1 | 2/2002 | Nakagawa et al. |
| 6,571,082 B1 | 5/2003 | Rahman et al. |
| 6,952,455 B1 | 10/2005 | Banister |
| 7,224,941 B2 | 5/2007 | Liu |
| 7,324,588 B2 | 1/2008 | Green et al. |

(Continued)

OTHER PUBLICATIONS

Meinila et al, D5.3: WINNER+Final Channel Models, Wireless World Initiative New Radio—Celtic Telecommunication Solutions, WINNER+, Version 1.0, Jun. 30, 2010, pp. 1-107.

(Continued)

*Primary Examiner* — Syed Haider
(74) *Attorney, Agent, or Firm* — Haynes Beffel & Wolfeld LLP; Ernest J. Beffel, Jr.; Andrew L. Dunlap

(57) ABSTRACT

The disclosed systems and methods for conducted massive MIMO array testing uses an efficient method of utilizing hardware resources for emulating signals from a massive MIMO base station transceiver to a MIMO mobile unit as dictated by a channel model; and also for emulating signals from a MIMO mobile unit to a massive MIMO BS transceiver, as dictated by a channel model. The system uses a phase matrix combiner to emulate the angular behavior of the propagation using virtual probes, combined with a radio channel emulator to create the temporal, multipath, and correlation behavior of the propagation. Using a phase matrix function increases the number of antenna elements that can be utilized in a massive MIMO array emulation while keeping the required number of fading channels within the radio channel emulator at a reduced number, thus forming a cost effective, yet realistic test system for massive MIMO testing.

23 Claims, 14 Drawing Sheets

(56) References Cited

U.S. PATENT DOCUMENTS

| | | | |
|---|---|---|---|
| 7,395,060 | B2 | 7/2008 | Liu |
| 7,398,056 | B1 | 7/2008 | Ebert et al. |
| 7,508,868 | B2 | 3/2009 | Chang |
| 7,715,844 | B2 | 5/2010 | Bi et al. |
| 8,331,869 | B2 | 12/2012 | Foegelle |
| 8,412,112 | B2 | 4/2013 | Foegelle |
| 8,761,684 | B2 | 6/2014 | Reed |
| 8,787,900 | B2 | 7/2014 | Amine et al. |
| 8,793,093 | B2 | 7/2014 | Mow et al. |
| 8,824,588 | B2 | 9/2014 | Emmanuel et al. |
| 8,880,002 | B2 | 11/2014 | Falck et al. |
| 8,912,963 | B2 | 12/2014 | Mow et al. |
| 8,995,511 | B2 | 3/2015 | Reed |
| 9,024,828 | B2 | 5/2015 | Reed |
| 9,107,098 | B2 | 8/2015 | Emmanuel et al. |
| 9,209,914 | B2 | 12/2015 | Reed |
| 9,246,607 | B2 | 1/2016 | Reed et al. |
| 2003/0050020 | A1* | 3/2003 | Erceg .............. H04B 7/04 455/101 |
| 2003/0124982 | A1 | 7/2003 | Saari et al. |
| 2004/0259554 | A1 | 12/2004 | Rappaport et al. |
| 2005/0085223 | A1 | 4/2005 | Liu |
| 2006/0148429 | A1 | 7/2006 | Inogai et al. |
| 2006/0229018 | A1 | 10/2006 | Mlinarsky et al. |
| 2006/0229020 | A1 | 10/2006 | Mlinarsky et al. |
| 2006/0233111 | A1* | 10/2006 | Wright ............ H04B 17/0087 370/241 |
| 2006/0252419 | A1 | 11/2006 | Liu |
| 2007/0019769 | A1 | 1/2007 | Green et al. |
| 2007/0236230 | A1 | 10/2007 | Tanbakuchi et al. |
| 2007/0243826 | A1 | 10/2007 | Liu |
| 2008/0056340 | A1 | 3/2008 | Foegelle |
| 2008/0114580 | A1 | 5/2008 | Chin et al. |
| 2008/0139195 | A1 | 6/2008 | Marsyla et al. |
| 2009/0094492 | A1 | 4/2009 | Music et al. |
| 2010/0177813 | A1 | 7/2010 | Gessner |
| 2010/0285753 | A1 | 11/2010 | Foegelle |
| 2011/0084887 | A1 | 4/2011 | Mow et al. |
| 2011/0189962 | A1 | 8/2011 | Kyosti et al. |
| 2011/0191090 | A1 | 8/2011 | Kyosti et al. |
| 2011/0299570 | A1 | 12/2011 | Reed |
| 2012/0098713 | A1 | 4/2012 | Mow et al. |
| 2012/0225624 | A1 | 9/2012 | Kyosti et al. |
| 2012/0275506 | A1 | 11/2012 | Ding et al. |
| 2012/0282863 | A1 | 11/2012 | Guo et al. |
| 2012/0309323 | A1 | 12/2012 | Guo et al. |
| 2013/0027256 | A1 | 1/2013 | Guo et al. |
| 2013/0210474 | A1 | 8/2013 | Kyosti |
| 2014/0126618 | A1* | 5/2014 | Kobayashi .......... H04B 17/391 375/224 |
| 2014/0241408 | A1* | 8/2014 | Sozanski ............ H04B 17/391 375/224 |
| 2015/0017928 | A1 | 1/2015 | Griesing et al. |
| 2016/0212641 | A1* | 7/2016 | Kong ................ H04B 17/3911 |
| 2016/0226709 | A1 | 8/2016 | Chen et al. |
| 2016/0233970 | A1 | 8/2016 | Reed |
| 2017/0279546 | A1 | 9/2017 | McGarry et al. |
| 2018/0034560 | A1* | 2/2018 | Foegelle ............ H04B 17/364 |

OTHER PUBLICATIONS

Macom Technology Data Sheet, MAPS-010165, Digital Phase Shifter 6-Bit, 3.5-6.0 GHz, V3, MACOM Technology Solutions Inc., 8 pages, Jan. 19, 2017.

Darbari et al, "MIMO Channel Modelling (Miron Signal Processing)", pp. 77-117, University of Strathclyde, Glasgow, ISBN 978-953-7619-91-6, published by InTech, Mar. 1, 2010, www.intechopen.com.

Spirent Vertex Channel Emulator Technical Specifications, Aug. 29, 2017, 2 pages.

Spirent Vertex Channel Emulator Data Sheet, rev. D, Aug. 2017, 4 pages.

"Programmable Phase Shifters", HJ Technologies, 64×16–1024, http://www.haojintech.com/index.php/product/index/id/167.html, Oct. 2, 2017, 3 pages.

"Programmable Phase Shifters", HJ Technologies, 16×16–256, http://www.haojintech.com/index.php/product/index/id/167.html, Oct. 2, 2017, 3 pages.

Harris et al, "From MIMO to Massive MIMO", University of Bristol (U.K.): Ian Mings British Telecom (BT), Sep. 15, 2017, Microwave Journal, http://www.microwavejournal.com/articles/print/28974-from-mimo-to-massive-mimo, 10 pages.

"Introduction to Network Analyzer Measurements", www.ni.com/rf-academy, National Instruments, Mar. 5, 2014, pp. 1-44.

"5G Spectrum Public Policy Position", Nov. 2016, GSMA, London EC4n 8AF UK, www.gsma.com, pp. 1-7.

"MIMO Beamforming Test System", https://www.spirent.com/Products/MIMO_Beamforming_Test_System, Oct. 10, 2017, pp. 1-4.

Larsson et al, "Massive MIMO for Next Generation Wireless Systems", IEEE Communications Magazine, vol. 52, Issue 2, Jan. 21, 2014, pp. 1-20.

Hoydis et al, "Massive MIMO in the UL/DL of Cellular Networks: How Many Antennas Do We Need?", IEEE Journal on Selected Areas in Communications, Institute of Electrical and Electronics Engineers, 2013, 31 (2), Jan. 8, 2014, pp. 160-171.

Bjornson et al, "Massive MIMO Systems with Hardware-Constrained Base Stations", Access Centre, Dept. of Signal Processing, KTH Royal Institute of Technology, Stockholm, Sweden, Mar. 19, 2014, pp. 1-5.

"3GPP on track to 5G", http://www.3gpp.org/news-events/3gpp-news/1787-ontrack_5g, Jun. 27, 2017, pp. 1-2.

Rusek et al, "Scaling Up MIMO: Opportunities and Challenges with Very Large Arrays", INFONET, GIST Journal club, Mar. 21, 2013, IEEE Signal Processing Magazine, pp. 1-12.

Li et al, "Dynamic Beamforming for Three-Dimensional MIMO Technique in LTE-Advanced Networks", Wireless Signal Processing and Network Lab, Key Lab of Universal Wireless Communications (Ministry of Education), Beijing University of Posts and Telecommunications, Hindawi Publishing Corp., Intl. Journal of Antennas and Propagation, vol. 2013, Article ID 764507, http://dx.doi.org/10.1155/2013/764507, Jul. 4, 2013, pp. 1-9.

Raschkowski et al, "METIS Channel Models", d1.4, https://www.metis2020.com/wp-content/uploads/METIS_D1.4_v3_pdf.2015, Mobile and wireless communications Enablers for the Twenty-twenty information Society (METIS), Jul. 14, 2015, 223 pages.

Molisch et al, "Hybrid Beamforming for Massive MIMO—A Survey", IEEE Comm. Mag., vol. 55, iss. 9, 2017, Apr. 30, 2017, pp. 1-13.

PCT/US2010/024204—International Preliminary Report on Patentability dated Aug. 16, 2011, 5 pages.

U.S. Appl. No. 13/147,579—Preliminary Amendment dated Aug. 2, 2011, 9 pages.

U.S. Appl. No. 13/147,579—Office Action dated Mar. 13, 2014, 17 pages.

U.S. Appl. No. 13/147,579—Response to Office Action dated Mar. 13, 2014 filed Aug. 13, 2014, 13 pages.

U.S. Appl. No. 13/147,579—Notice of Allowance dated Nov. 24, 2014, 8 pages.

PCT/US2010/024204—International Search Report and Writen Opinion dated Aug. 2, 2010 9 pp.

U.S. Appl. No. 14/801,746—Office Action dated Jun. 28, 2016, 14 pages.

Rumney, "LTE and the Evolution to 4G Wireless: Design and Measurement Challenges," Agilent Technologies Publication, Chapter 6: "Design and Verification Challenges", 2009, pp. 199-411.

"Move Forward to What's Possible in LTE," Agilent Technologies, Inc., Mar. 16, 2009, pp. 1-12, accessed at http://www.agilent.com/find/lte.

"Agilent 3GPP Long Term Evolution: System Overview, Product Development, and Test Challenges," Application Note, Agilent Technologies, Inc., Sep. 8, 2009, pp. 1-92, accessed at http://www.agilent.com/find/LTE.

(56) References Cited

OTHER PUBLICATIONS

"E6620 Wireless Communications Test Set," Agilent Technologies, Inc., Jun. 8, 2009, pp. 1-12, accessed at http:// www.agilent.com/find/8960devicedesign.

Technical White Paper, "Long Term Evolution (LTE): A Technical Overview," Motorola, Inc., 2007, pp. 1-15, accessed at www.motorola.com.

Narandzic, et al., "Comparison of SCM, SCME, and WINNER Channel Models," IEEE, 2007, pp. 413-417.

Berger, Lars T., et al., "Geometry Based Other-Sector Interference Modelling for Downlink Systme Simulations", 2004, 5 pages.

Baum, Daniel S., et al., "An Interim Channel Model for Beyond-3G Systems", 2005, 5 pages.

Cita, "Test Plan for 2×2 Downlink MIMO and Transmit Diversity Over-the-Air Performance", Aug. 2015, 75 pages.

Huang, Kaibin, et al., "Spacial Interference Cancellation for Mulitantenna Mobile Ad Hoc Networks", Mar. 2012, 17pages.

Written Opinion of corresponding PCT Application No. PCT/US2010/024202, dated Sep. 17, 2010, pp. 1-4.

U.S. Appl. No. 14/801,746—Office Action dated Apr. 11, 2017, 11 pages.

U.S. Appl. No. 14/801,746—Response to Office Action dated Jun. 28, 2016 filed Sep. 9, 2016, 10 pages.

U.S. Appl. No. 14/801,746—Final Office Action dated Nov. 25, 2016, 13 pages.

U.S. Appl. No. 14/801,746—Response to Final Office Action dated Nov. 25, 2016 filed Feb. 21, 2017, 11 pages.

Reed, "MIMO OTA Antenna Measurements", CTIA Panel Session, Mar. 2011, Orlando.

Fundamentals of channel emulation, Mar. 15, 2012, octoScope, 225 Cedar Hill Street, Ste. 200, Marlborough, MA 01752 USA, www.octoScope.com.

Reed, "MIMO OTA Test Methods", CTIA Panel Session, May 2012, 32 pages, New Orleans, LA.

U.S. Appl. No. 15/620,610—Office Action dated Dec. 21, 2017, 9 pages.

Meinila et al., "D5.3: WINNER+ Final Channel Models", Celtic Telecommunication Solutions, CELTIC/CP5-026, WP5, Editor: Petted Heino, Jun. 30, 2010, pp. 1-107.

U.S. Appl. No. 14/801,746—Response to Office Action dated Apr. 11, 2017 filed Aug. 10, 2017, 12 pages.

U.S. Appl. No. 14/801,746—Final Office Action dated Oct. 17, 2017, 19 pages.

U.S. Appl. No. 14/801,746—Response to Final Office Action dated Oct. 17, 2017 filed Apr. 9, 2018, 20 pages.

U.S. Appl. No. 14/801,746—Office Action dated Jul. 9, 2018, 18 pages.

U.S. Appl. No. 14/801,746—Response to Office Action dated Jul. 9, 2018 filed Aug. 23, 2018, 15 pages.

U.S. Appl. No. 14/801,746—Notice of Alliowance dated Nov. 6, 2018, 7 pages.

U.S. Appl. No. 15/620,610—Response to Office Action dated Dec. 21, 2017, filed Mar. 20, 2018, 9 pages.

U.S. Appl. No. 15/620,610—Notice of Allowance dated Jul. 16, 2018, 5 pages.

U.S. Appl. No. 15/620,610—Notice of Allowance dated Aug. 8, 2018, 2 pages.

U.S. Appl. No. 15/620,610—Notice of Allowance dated Oct. 31, 2018, 21 pages.

\* cited by examiner

| Downlink | | | |
|---|---|---|---|
| Point | Explanation | Loss [dB] | Level [dBm] |
| A | gNb output | 0 | 23 |
| B | Cable loss | 5 | 18 |
| C | Array gain | -19 | 37 |
| D | Cable loss | 5 | 32 |
| E | Matrix loss | 50 | -18 |
| F | Cable loss | 5 | -23 |
| G | Fader loss | 15 | -38 |
| H | Cable loss | 5 | -43 |

FIG. 7A

| Uplink | | | |
|---|---|---|---|
| Point | Explanation | Loss [dB] | Level [dBm] |
| H | Output of UT | 0 | 23 |
| G | Cable loss | 5 | 18 |
| F | Fader loss | 15 | 3 |
| E | Cable loss | 5 | -2 |
| D | Matrix loss | 50 | -52 |
| C | Cable loss | 5 | -57 |
| B | Array gain | -19 | -38 |
| A | Cable loss | 5 | -43 |

FIG. 7B

| 0 | 0 | 0 | 0 | 0 | 0 | 0 | 0 | 0 |
|---|---|---|---|---|---|---|---|---|
| 0 | 180.0000 | 0 | 180.0000 | 0 | 0 | 180.0000 | 0 | 180.0000 |
| 13.4895 | 13.4895 | -13.4895 | -13.4895 | -101.0789 | -101.0789 | -78.0415 | 77.8870 | 101.4341 |
| 13.4895 | -166.5105 | -13.4895 | 166.5105 | -101.0789 | 78.9211 | -78.0415 | 77.8870 | -78.5659 |
| 26.9790 | 26.9790 | -26.9790 | -26.9790 | 157.8421 | 157.8421 | 101.9585 | -102. | |
| 26.9790 | -153.0210 | -26.9790 | -26.9790 | 157.8421 | -22.1579 | -156.0830 | 155.7740 | 155. |
| 40.4685 | 40.4685 | -40.4685 | -40.4685 | 56.7632 | 56.7632 | 23.9170 | 155.7740 | -157.1319 |
| 40.4685 | -139.5315 | -40.4685 | 139.5315 | 56.7632 | -123.2368 | 125.8755 | -126.3389 | 22.8681 |
| 5.6539 | 5.6539 | -5.6539 | -5.6539 | -15.0620 | -15.0620 | 125.8755 | -126.3389 | -55.6978 |
| 5.6539 | -174.3461 | -5.6539 | 174.3461 | -15.0620 | 164.9380 | -54.1245 | -11.9293 | 124.3022 |
| 19.1434 | 19.1434 | -19.1434 | -19.1434 | -116.1410 | -116.1410 | -3.7696 | -11.9293 | -0.6283 |
| 19.1434 | -160.8566 | -19.1434 | 160.8566 | -116.1410 | 63.8590 | 176.2304 | 65.9577 | 179.3717 |
| 32.6330 | 32.6330 | -32.6330 | -32.6330 | 142.7801 | 142.7801 | -81.8112 | 65.9577 | 100.8058 |
| 32.6330 | -147.3670 | -32.6330 | 147.3670 | 142.7801 | -37.2199 | -81.8112 | 143.8447 | -114. |
| 46.1225 | 46.1225 | -46.1225 | -46.1225 | 41.7012 | 41.7012 | 98.1880 | 143.8447 | 65. |
| 46.1225 | -133.8775 | -46.1225 | 133.8775 | 41.7012 | -138.2988 | -159.8527 | -138.2682 | -79.1942 |
| 11.3079 | 11.3079 | -11.3079 | -11.3079 | -30.1240 | -30.1240 | 20.1473 | -138.2682 | -157.7602 |
| 11.3079 | -168.6921 | -11.3079 | 168.6921 | -30.1240 | 149.8760 | 122.1058 | -23.8586 | 22.2398 |
| 24.7974 | 24.7974 | -24.7974 | -24.7974 | -131.2030 | -131.2030 | 122.1058 | -23.8586 | -56.3261 |
| 24.7974 | -155.2026 | -24.7974 | 155.2026 | -131.2030 | 48.7970 | -57.8942 | 54.0284 | 123.6739 |
| | | | | | | 172.4607 | 54.0284 | -1.2566 |
| | | | | | | -85.5808 | | 178.7434 |
| | | | | ○ | ○ | -85.5808 | ○ | 100.1774 |
| | | | | ○ | ○ | 94.4192 | ○ | -79.8226 |
| | | | | ○ | ○ | | ○ | |
| 80.0461 | 80.0461 | -80.0461 | -80.0461 | -48.6709 | -48.6709 | 99.4880 | 150.1559 | -60.0960 |
| 80.0461 | -99.9539 | -80.0461 | 99.9539 | -48.6709 | 131.3291 | 99.4880 | 150.1559 | 119.9040 |
| | | | | | | -80.5120 | 150. | |
| | | | | | | | -29. | |

FIG. 10

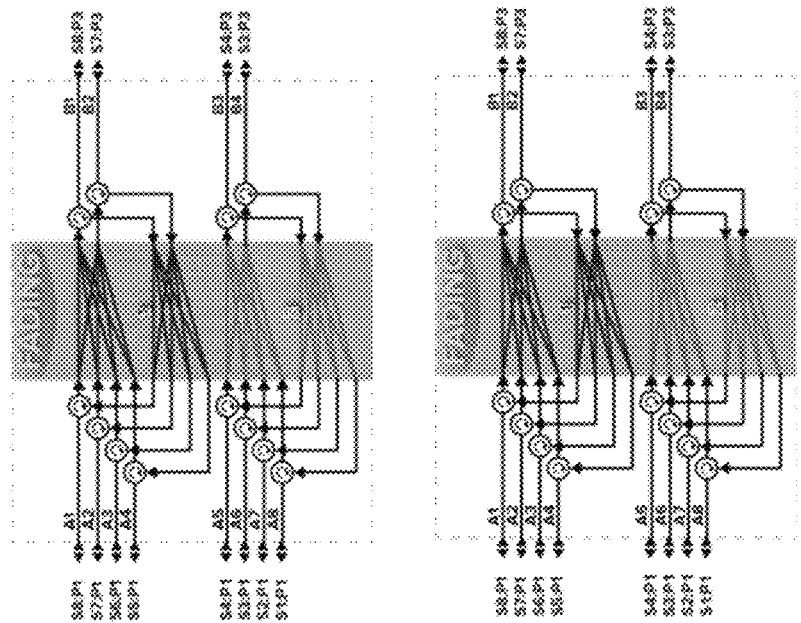
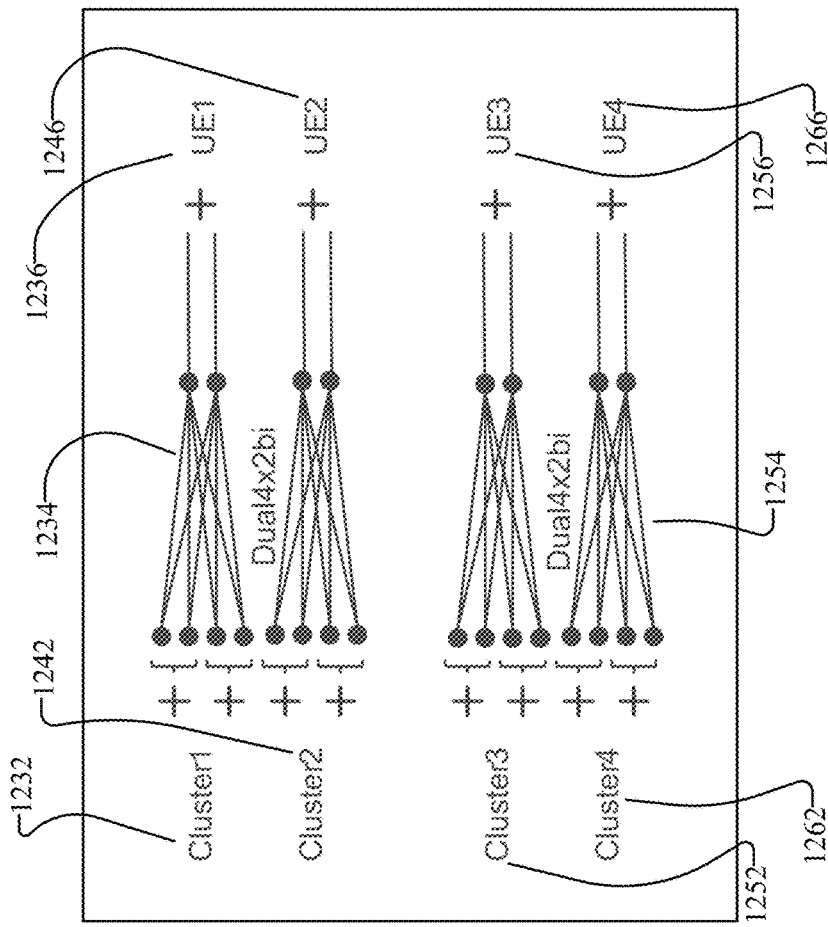
FIG. 12B
FIG. 12A

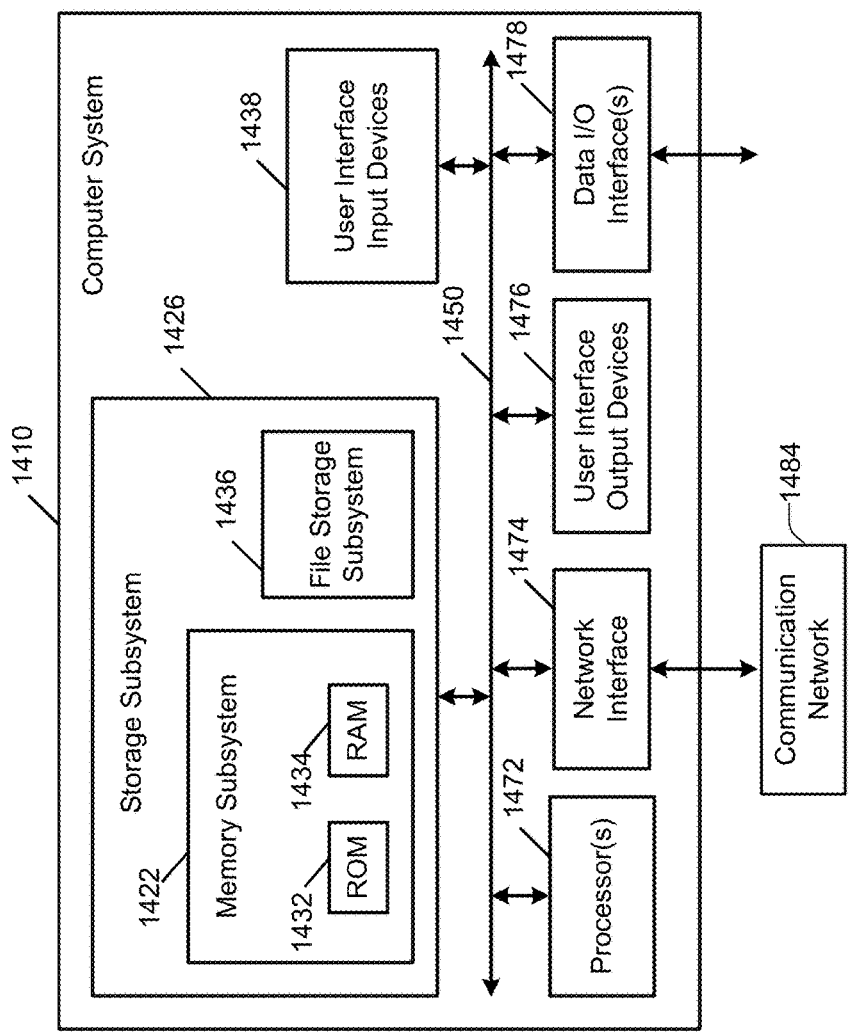
Fig. 14 Computer System

MASSIVE MIMO ARRAY TESTING USING A PROGRAMMABLE PHASE MATRIX AND CHANNEL EMULATOR

RELATED APPLICATIONS

This application is related to U.S. patent application Ser. No. 15/620,610, entitled "OVER THE AIR TESTING FOR MASSIVE MIMO ARRAYS," filed Jun. 12, 2017, which claims priority to U.S. Provisional Application No. 62/350,131, entitled "OVER THE AIR TESTING FOR MASSIVE MIMO ARRAYS," filed on Jun. 14, 2016, both of which are incorporated by reference herein.

This application is related to U.S. patent application Ser. No. 14/801,746, entitled "Massive MIMO Array Emulation," filed Jul. 16, 2015, which is incorporated by reference herein.

This application is related to U.S. patent application Ser. No. 13/147,579, entitled "Emulation and Controlled Testing of MIMO OTA Channels," filed Aug. 29, 2011, now U.S. Pat. No. 8,995,511, issued Mar. 31, 2015, which is incorporated by reference herein.

BACKGROUND

Massive multiple-input multiple-output antenna techniques provide an effective means for significantly increasing the capacity of cellular communication systems while possibly reducing their energy consumption. Multiple-Input-Multiple-Output (MIMO) antenna techniques are key factors in achieving the high data rates promised by next-generation wireless technologies such as LTE (Long-Term Evolution), LTE-Advanced and $5^{th}$ generation technologies.

MIMO systems are designed to take advantage of spatial diversity available in the propagation environment. The spatial diversity is quantified by the correlation between antennas, a function of both the propagation environment and the antenna patterns. Under ideal conditions an M×N MIMO system (one using M transmitting antenna elements and N receiving antenna elements) can increase maximum data rates by a factor of min{M,N} times those available from a Single-Input Single-Output (SISO) system operating in the same bandwidth. In other words, a 4×2 MIMO system can (under ideal conditions) double the data rates available in a SISO implementation, while a 4×4 MIMO system can potentially quadruple those rates. However, classical array modeling via MIMO emulation is expensive and prohibitively complex to build, and channel emulators have a limited number of possible inputs.

Development of fifth generation technologies such as 5G wireless telecommunication systems is currently on-going in various organizations. One key differentiator of 5G networks is using massive MIMO to boost capacity by deploying very narrow beams in certain directions. Massive MIMO utilizes many antenna elements, and testing massive MIMO would theoretically require lots of hardware resources. A desire exists to minimize the needed hardware resources, due to both cost and space limitations in testing environments.

Performance testing of a 5G gNodeB (gNB) can be subdivided into over-the-air (OTA) and conductive test methods. These categories can be further subdivided into below 6 GHz and above 6 GHz testing. Many of the 5G frequency allocations are on sub 6 GHz bands.

An opportunity arises to provide systems and methods for conducted, massive MIMO array testing in multiple scenarios. In one case, downlink testing is achieved by emulating broadcast signals from a massive MIMO base station controller to a MIMO mobile unit consistent with a channel model; in another case, uplink testing is carried out by emulating signals from a MIMO mobile unit to a massive MIMO base station antenna array.

SUMMARY

One implementation of the disclosed technology teaches a method of emulating signals from a massive MIMO base station transceiver to a MIMO mobile unit as dictated by a channel model which includes, at a programmable radio phase shifter and combining matrix (PSM), conductively receiving antenna element driver signals from a base station transceiver and constructing virtual probe signals that represent line-of-sight and multi-pathing from a massive MIMO base station transceiver to a MIMO mobile unit, as dictated by the channel model, and then at a channel emulator, combining and applying spatial and temporal correlation to the virtual probe signals for conductive transmission to the mobile unit, thereby implementing the channel model. The disclosed method also includes the PSM constructing the virtual probe signals from the antenna element driver signals, by applying phase shifting and attenuation functions and combining the phase shifted and attenuated driver signals to produce the virtual probe signals at PSM outputs; the channel emulator combining the PSM outputs and applying spatial and temporal correlation to the virtual probe signals to produce channel emulator outputs; and conductively relaying the channel emulator outputs to antennas of the MIMO mobile unit.

Particular aspects of the technology disclosed are described in the claims, specification and drawings.

BRIEF DESCRIPTION OF THE DRAWINGS

FIG. 7A shows a table of example link budget values for downlink and FIG. 7B shows an example link budget for uplink.

FIG. 10 shows an example phase array table of 64 rows and 16 columns.

FIG. 12A shows another example of phase matrix beam forming with a use case in which each of four NLOS clusters are directed to a single UE through two dual 4×2 bi-directional independent channel models.

FIG. 12B shows details for the two dual 4×2 bi-directional independent channel models, with colors representing bi-directional independent channels in the faders.

FIG. 14 is a simplified block diagram of a system for emulating signals from a massive MIMO base station transceiver to a MIMO mobile unit as dictated by a channel model.

DETAILED DESCRIPTION

Figure 1:
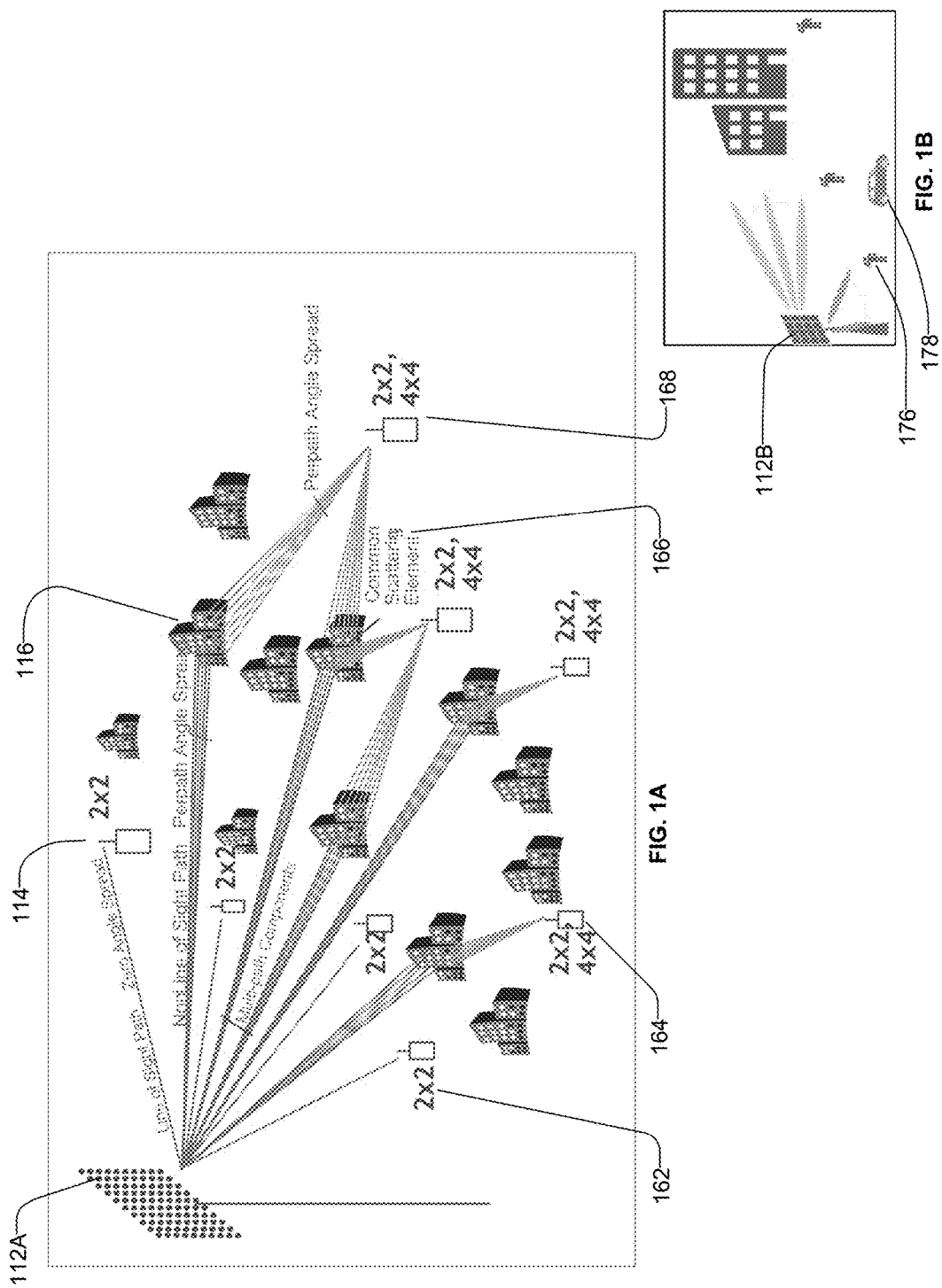
FIG. 1A shows an example massive MIMO array environment.
FIG. 1B shows examples of motion of user equipment in massive MIMO array environment.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

The disclosed methods and systems for conducted, massive MIMO array performance testing are based on using a combination of a programmable radio phase shifter splitting and combining matrix (abbreviated PSM for phase shifter matrix) and a high fidelity radio channel emulator (CE) to emulate broadcast signals from a massive MIMO base station controller to a MIMO mobile unit and to emulate signals from a MIMO mobile unit to a massive MIMO base station antenna array, consistent with a channel model. Connecting the massive MIMO array of elements to the CE via a phase matrix allows for a simplification in the amount of hardware required for testing. The phase matrix provides a single phase-adjustable signal, connected between each input port to each output port, which can be used to model a single spatial direction, similar to the effect of having a test probe in an anechoic chamber. The single phase-adjustable signals of the virtual probe are then supplied to the CE. The CE can provide simulated mobility, signal correlation, and multipath spread to the test system. The virtual probes define the spatial clusters observed by the massive MIMO array, while the remainder of the channel is simulated in the CE and connected to the user equipment (UE). Thus with the combination of the phase matrix and channel emulator, a given spatio-temporal channel model can be created in a more efficient manner than can be achieved using the resources of the radio channel emulator alone. Conducted performance testing emulates an over-the-air (OTA) test using only bench-top lab equipment. The disclosed technology can also be applied to user equipment with a single antenna.

Massive MIMO systems are generally designed to communicate with one to many simultaneous users. FIG. 1A illustrates an example massive MIMO array environment, which contains a massive MIMO array of antennas (MM) 112A, and a mix of line-of-sight (LOS) 114, 162 and non-line-of-sight (NLOS) 162, 168 users scattered about a coverage area. For NLOS users, the propagation paths are obstructed in some way—creating a set of sub-components of the path, which are modeled by an angle spread (AS). The AS observed at the base station is usually quite narrow, being a few degrees in azimuth and elevation. The spread in azimuth is usually a bit more than the spread in elevation. The AS observed by the user equipment (UE) 168 is generally much higher due to the proximity to the scattering elements 116, 166. Sometimes a common scattering element may provide signal to more than one UE.

Massive MIMO array antennas may have a large number of radiating elements, usually in a rectangular grid 112A with element spacing equal to one half the wavelength of the carrier frequency. This spacing may vary, but is usually less than the wavelength of the carrier frequency. When dual polarized elements are used, often +/−45 degree antenna elements or 0/+90 degree elements are co-located, and spaced apart from the next pair of elements in the grid. These dual polarized elements enable the antenna to couple signals to and from the channel in vertical and horizontal polarization. Massive MIMO array antennas are valid for both uplink and downlink signals, and support time division duplexing (TDD) and frequency division duplexing (FDD). Packets can be interspersed between downlink packets and uplink packets. TDD operates in a single frequency band; frequency division duplex (FDD) utilizes paired frequency bands. Algorithms for creating virtual probes can utilize either TDD or FDD, as directed by the models.

Multipath propagation is often observed for NLOS users. This type of propagation is indicated by having more than one path that reaches the UE, usually with each path having different path delays and different angles of departure and arrival observed at the base station (BS) and the UE respectively. The disclosed technology emulates a mixed environment, having one or more users, which experiences one of several different propagation mechanisms, such as those described supra, in order to test a massive MIMO system.

FIG. 1B shows a typical deployment scenario for massive MIMO: a physical environment with multiple users in a multi-cluster radio channel environment, with massive MIMO array 112B, user movement 176, 178 and motion of the spatial clusters. A multi-cluster, multi-user channel model is usable as an example case to illustrate the test capabilities. User movement and motion of the spatial clusters are also described infra.

To model the complex propagation environment illustrated in FIG. 1B, including the user mobility, it is required to have channel emulation equipment that creates a virtual propagation environment. It is essential to create both a spatial environment that emulates cluster departure and arrival directions, and also a temporal model with the correct fading behavior as well as correlation between fading signals to evaluate the dynamically changing environment to test active antenna systems in gNBs.

The operation of the massive MIMO array antenna 112A is typically bi-directional, so both uplink and downlink signals are emulated. It is usually a time division duplex (TDD) system with the same carrier frequency used on the uplink and downlink, but it may also be a frequency division duplex (FDD) system, with different frequencies used on the uplink and downlink. UE can be mobile phones or emulated phones. ABS or BS emulator controls the UE, setting up a test mode, creating or simulating data, measuring throughput (TP), and monitoring both the uplink and downlink.

A typical 5G gNB will include a planar antenna array with 3D beamforming. In receive mode, the array can observe signal paths in azimuth and elevation on the uplink within the field of view of the array. A selected set of complex weights applied to the array elements allow the array to focus a beam in a selected direction according the array factor. Significant processing power may be utilized to determine the complex weights used at the gNB array.

Since most 5G scenarios will utilize bi-directional Time Division Duplex (TDD), this approach is described in detail herein. In this case the same weights used for the receiver can also be used to transmit on the downlink, thus energizing the same paths that are determined by the gNB to connect to the UE. The channel model is defined by the departure geometry at the base station gNB, by the directions to the first bounce. The directions from the last bounce to the UE are also specified along with a path delay and Doppler shift. Specifying the departure and arrival directions of the path is sufficient to model double-directional geometric radio channels.

RF matrices can be used as analog beam formers, but they cannot introduce channel propagation impairments like multipath, Doppler, UE antenna correlation, and noise. For that purpose, the disclosed system and method include a channel emulator. By emulating virtual probes, a hardware simplification can be accomplished to reduce the overall amount of test equipment. This disclosed technology also describes the methods needed to calibrate the system in phase and amplitude. Additionally, this disclosure describes the methods to control cross-polarization ratio of an emulated propagation channel. Virtual probe techniques are also described.

Figure 2:
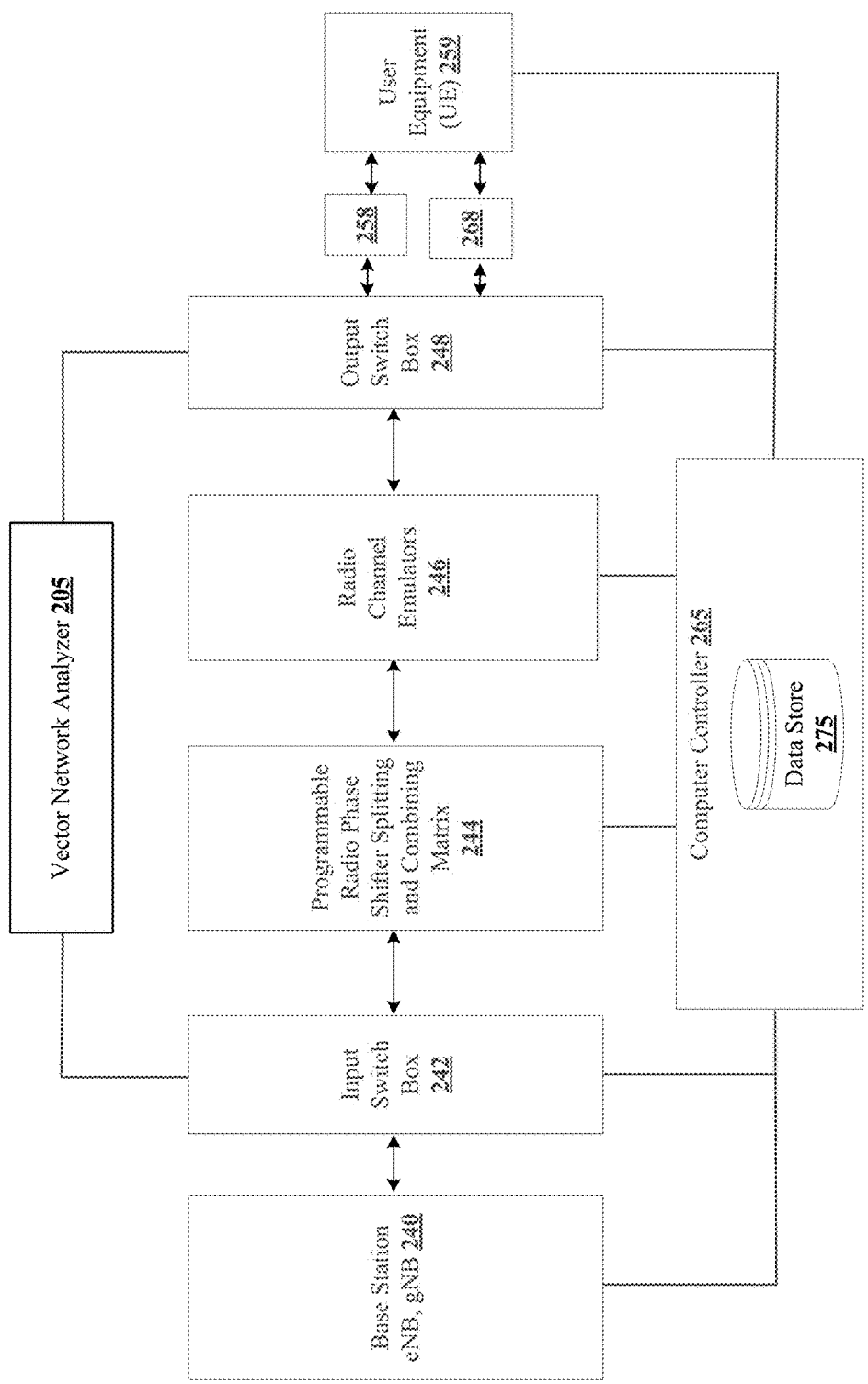
FIG. 2 is a block diagram of a system for massive MIMO antenna array and MIMO mobile unit testing and for system calibration.

FIG. 2 illustrates the block diagram for disclosed system 200 for conducted massive MIMO array testing, including programmable radio phase shifter splitting and combining matrix 244 (abbreviated PSM for phase shifter matrix) that provides a single phase adjustable connection between each input port to each output port and radio channel emulators 246 that provide simulated mobility, signal correlation, and multipath spread to the array testing system.

Continuing with the description of FIG. 2, system 200 also includes switch box 242 for routing signals between vector network analyzer (VNA) 205 and programmable radio phase shifter splitting and combining matrix 244, as well as for routing signals between eNodeB (eNB), gNodeB (gNB) base station 240 and matrix 244. Switch box 248 routes signals between user equipment (UE) 259 combiners 258, 268 and radio channel emulators 246, and between VNA 205 and radio channel emulators 246. VNA 205 characterizes programmable radio phase shifter splitting and combining matrix 244 and radio channel emulators 246 by measuring their network parameters, as a function of frequency, typically in continuous wave mode. At the time of this writing, commercial eNBs have at most 8 antenna ports; so the need for an RF matrix is greatly diminished, since current channel emulators can handle those cases.

System 200 also includes computer controller 265 that includes software that controls programmable radio phase shifter splitting and combining matrix 244, radio channel emulators 246, VNA 205 and switch boxes 242, 248 for synchronizing testing operations. Additionally, software is utilized for phase calibration of programmable radio phase shifter splitting and combining matrix 244, including enabling each link individually, measuring the phase, and storing the measurements in data store 275 for use in calibration calculations, described further infra.

Figure 3B:
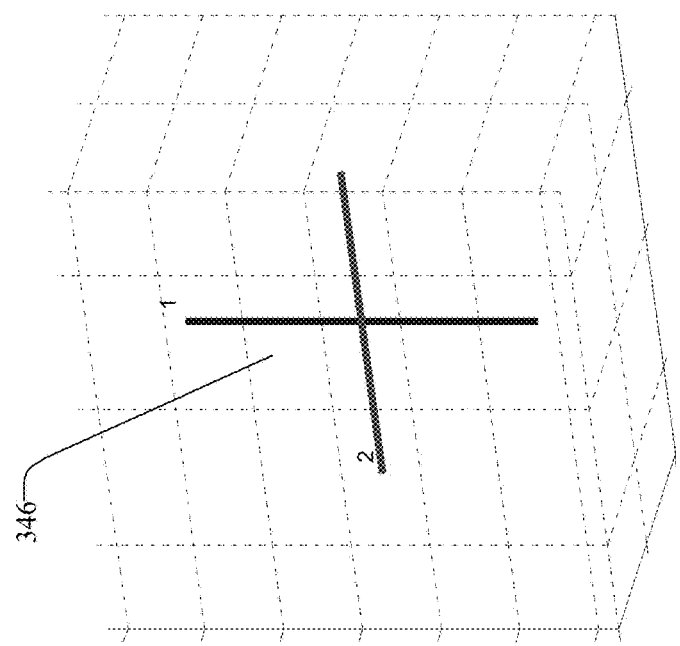
FIG. 3B shows example user equipment array elements.
Figure 3A:
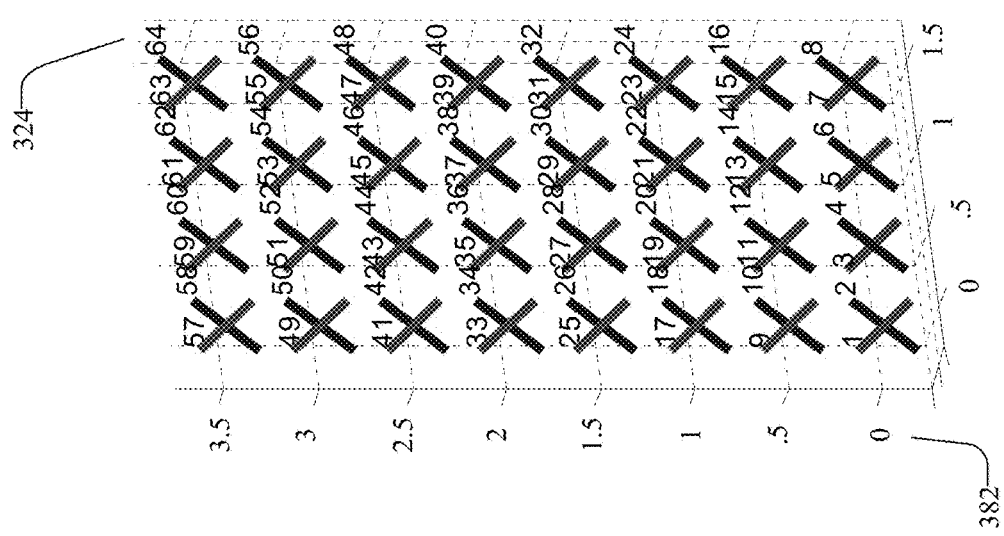
FIG. 3A shows a 2D planar array example having 8×4 dual polarized base station array elements.

For gNB testability, a specific predefined channel model is selected, having specific azimuth and elevation angles defined for each path component. FIG. 3A shows a 2D planar array example having 8×4 dual polarized base station array elements: one through sixty-four 324 with dimensions 382 in wavelengths λ. Each of the slanted left (\) and slanted right (/) elements form separate beam patterns. When the array observes the channel model in the far field, a scanning algorithm or other technique may be used to determine the path directions. FIG. 3B shows example user equipment array elements number one and two 346. Virtual probes are also defined by the orientation and number of array elements number one and two 346.

When a path is measured over-the-air (OTA), the signal will be observed from its physical direction, as supplied by a probe in a test chamber, typically via a two element (+) dual polarized probe with separate vertical (V) and horizontal (H) polarizations. For a conducted model, the signal must be supplied by a virtual probe that is formed by a matrix of phases representing the far field response of the array. When a conducted measurement is made, a gain and phase calibration process is required, described infra. Then cables are connected to each physical antenna port. The actual array elements are normally bypassed with this approach, so the element's pattern must be incorporated into the signals provided to the array ports. To simplify the example, an ideal isotropic response is assumed for all array elements in this example use case; however other pattern shapes can be used. An isotropic antenna is a hypothetical lossless antenna that has equal radiation in all directions. It is ideal and not physically realizable, and is often taken as a reference for expressing the directive properties of actual antennas.

Figures 4A, 4B:
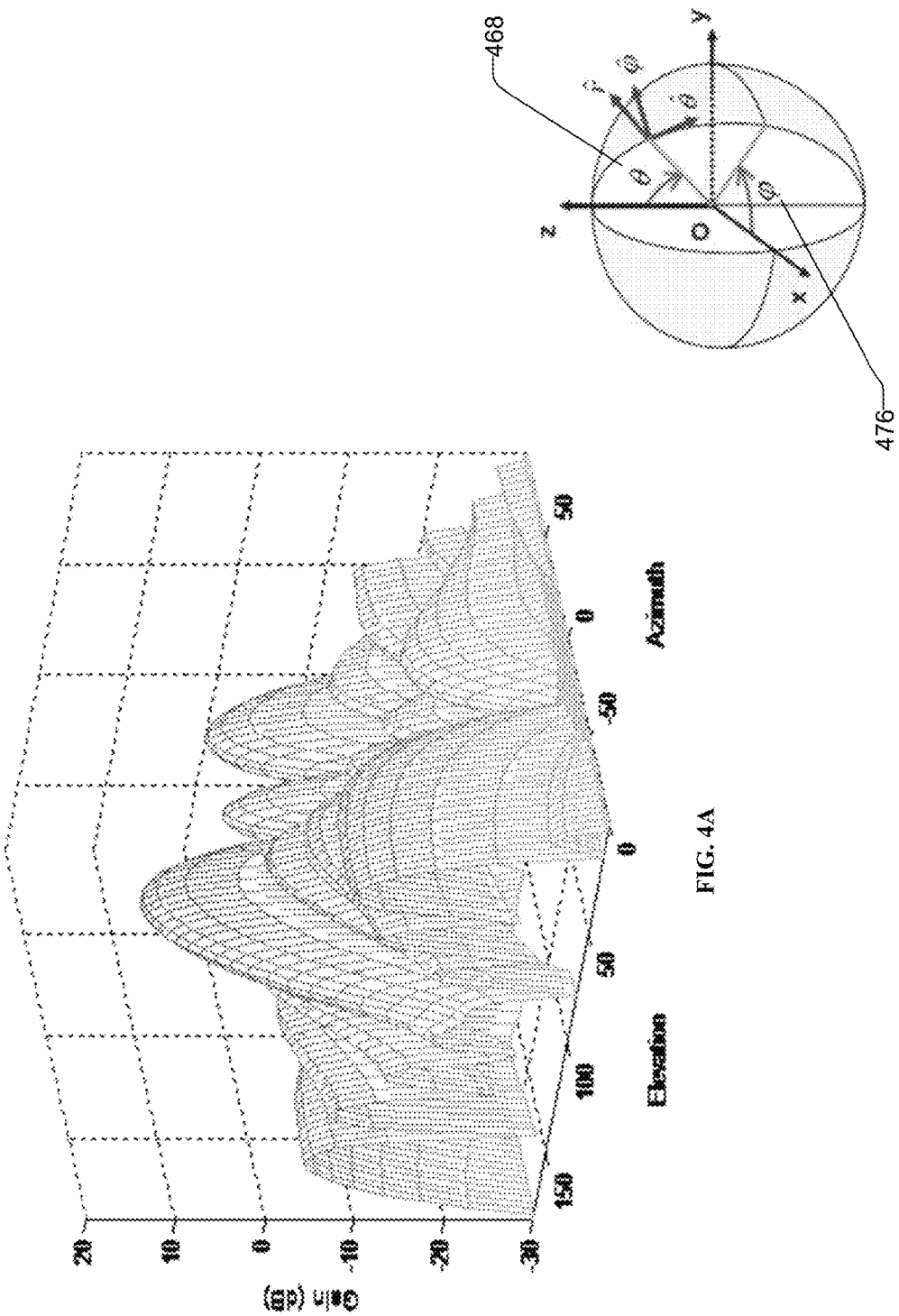
FIG. 4A illustrates the 2D beam pattern which has an azimuth beam at −30.7 degrees, and an elevation angle of 91.8 degrees.
FIG. 4B illustrates azimuth and elevation angles in a rectangular coordinate system.

Each of the slanted left (\) and slanted right (/) elements form a separate beam pattern. FIG. 4A illustrates the 2D beam pattern which has an Azimuth beam at −30.7 degrees, and an elevation angle of 91.8 degrees. Several side lobes are present as expected, with the elevation dimension having significantly more resolution as observed by the narrower pattern and additional slide-lobes compared with the azimuth dimension, due to the array geometry. FIG. 4B shows a reference coordinate plot that includes the relationship between elevation theta 468 and azimuth phi 476. A value of zero for theta is vertical on the z axis.

Massive MIMO testing using a traditional conducted connection would require a very large number of radio channels from the testing equipment. This is virtually impossible with commercially available channel emulator hardware due to the size and cost of the equipment, which is not easily scaled up to array sizes that are being proposed for 5G, with as many as 256 elements or more. Thus, there is a desire to minimize the needed hardware resources due the cost and space limitations in laboratory environment.

The purpose of the disclosed test system is to create an environment in which multiple users can be tested in a multi-cluster radio channel environment. Some of the users are desired users and some may be interfering users. Several system parameters, including capacity gain, link margin, and control of interference are evaluated by using massive MIMO arrays. The measurement quantifies the improvement expected from having very narrow beams resulting in higher signal-to-noise ratio for desired users as well as steering the null vectors into directions with unwanted users, that is, interferers.

Note that the number of inputs (M) to the programmable radio phase shifter splitting and combining matrix 244 is generally larger than number of outputs (N), providing a considerable savings in the CE resources required to emulate the dynamic behavior of a radio channel. This can be compared to hybrid beamforming where antenna element count is larger than AD converter count. The construction of programmable radio phase shifter splitting and combining matrix 244 consists of M splitters of size N with outputs connected to N combiners of size M, having an adjustable phase element on each input to output connection. It is also possible to include a programmable attenuator along with the adjustable phase element on each input to output connection.

Figure 5:
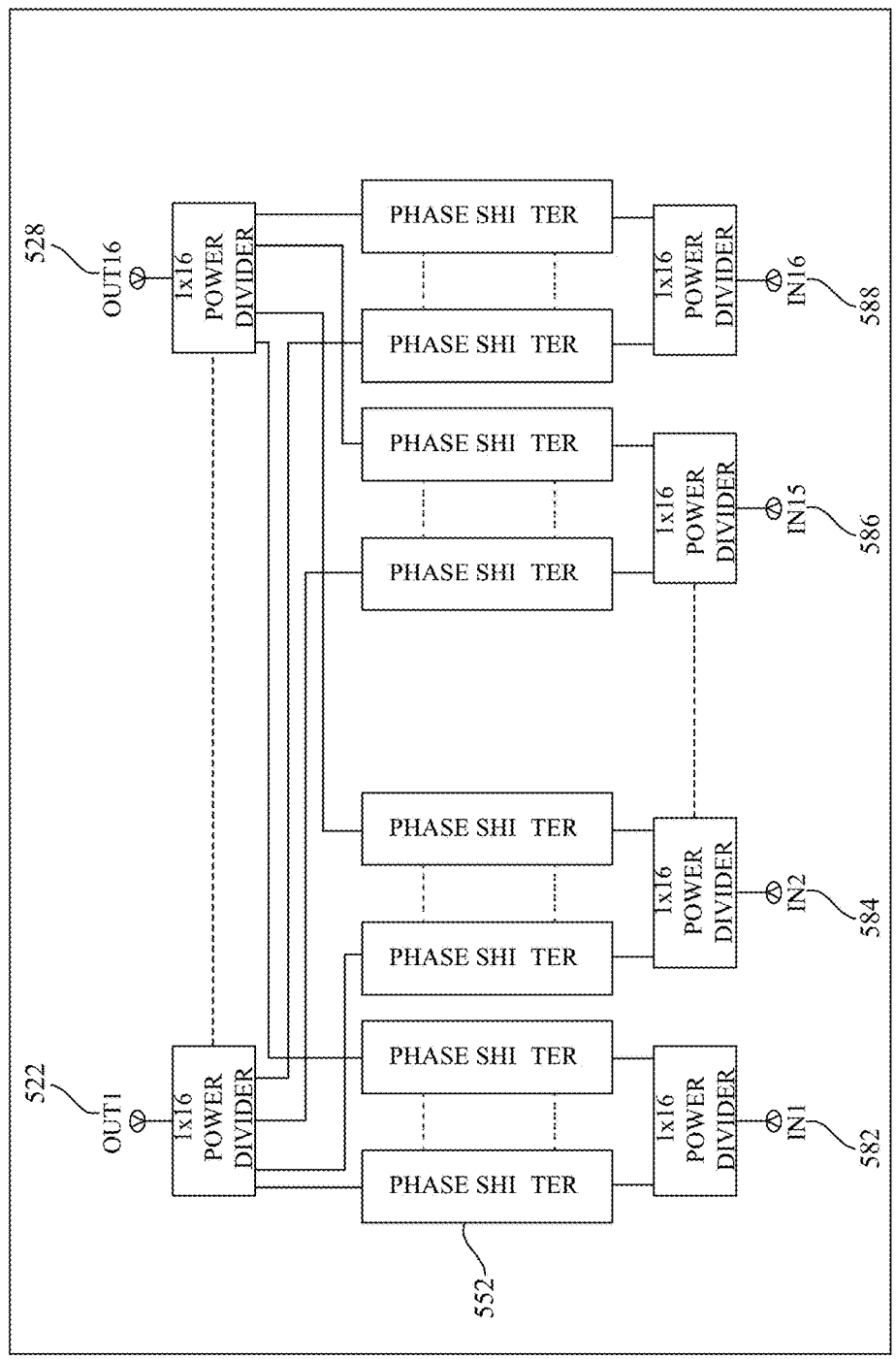
FIG. 5 shows an example programmable radio phase shifter splitting and combining matrix.

FIG. 5 shows an example programmable radio phase shifter splitting and combining matrix 244 that includes sixteen power divider inputs 582, 584, 586, 588, also referred to as splitters and sixteen power divider outputs 522, 528, also referred to as combiners. The terms 'splitter' and 'combiner' are usable interchangeably.

Phase shifter matrix 244 includes a phase matrix function, implemented with a set of phase shifters 542, which provides only gain and phase control to each input to output pair. Thus, without a delay element, only a single spatial characteristic can be emulated for each virtual probe. However multiple paths with unique temporal and delay characteristics can be modeled using the channel emulators 246 representing multipath that originates within the same path direction from the base station 240 (BS). Modeling spatial clusters in this way enables the use of the phase shifter matrix 244 as a pre-processor to the channel emulators 246, wherein the phase shifter matrix 244 can connect the BS array to the virtual probes. The virtual probes are then applied to the CE, where fading, path powers and delay, and cross polarization (XPR) are applied to complete the channel model. The phase matrix function can be utilized as a frontend pre-processor for downlink from a base station to a mobile unit, and as a backend post-processor for uplink from a MIMO mobile unit to a base station.

A link budget is used for accounting of all of the gains and losses from the transmitter, through the medium to the receiver in the system. It accounts for the attenuation of the transmitted signal due to propagation, as well as the antenna gains, feedline and miscellaneous losses. Randomly varying channel gains such as fading are taken into account by adding some margin depending on the anticipated severity of its effects. FIG. 7A shows a table of example link budget values for downlink and FIG. 7B shows an example link budget for uplink, representing the losses as described for points A through H. The signal loss in dB of the phase matrix is highly dependent on the number of input-output ports in phase shifter matrix 244.

External software included in computer controller 265 controls programmable radio phase shifter splitting and combining matrix 244 and channel emulators 246 such that the operation is synchronized. Thus, temporal realization of radio channel is connected to appropriate spatial realization of the radio channel.

One key consideration in the disclosed methods for utilizing phase shifter matrix 244 is that the phase change is quantized. This introduces phase quantization noise to beam forming. The results of a sensitivity test comparing steps of 2.8 and 5.2 degrees, for an 8-element test, show that the beam forming ability is similar to that for reproducing the array factor expected when continuous phase beam forming is utilized.

Figure 8B:
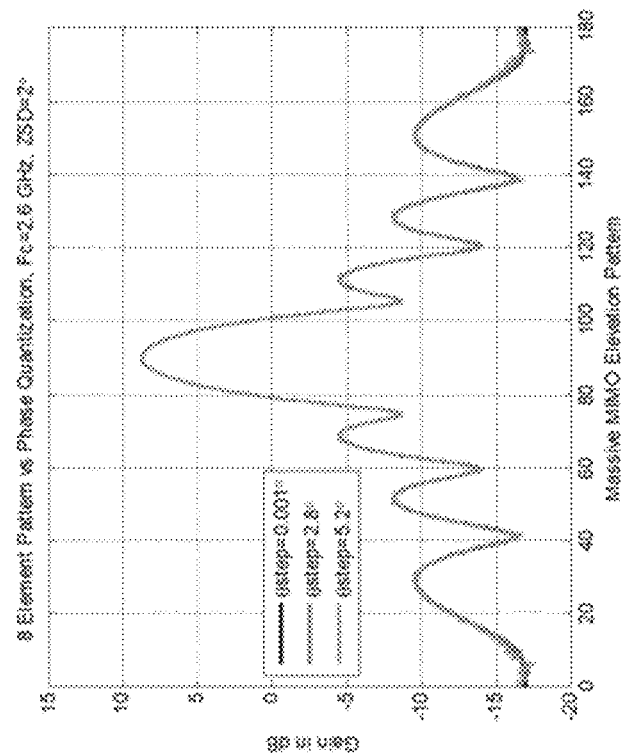
FIG. 8A depicts the effect of quantization noise to the beam former in LOS case and FIG. 8B depicts the effect of quantization noise to the beam former in the NLOS propagation case.
Figure 8A:
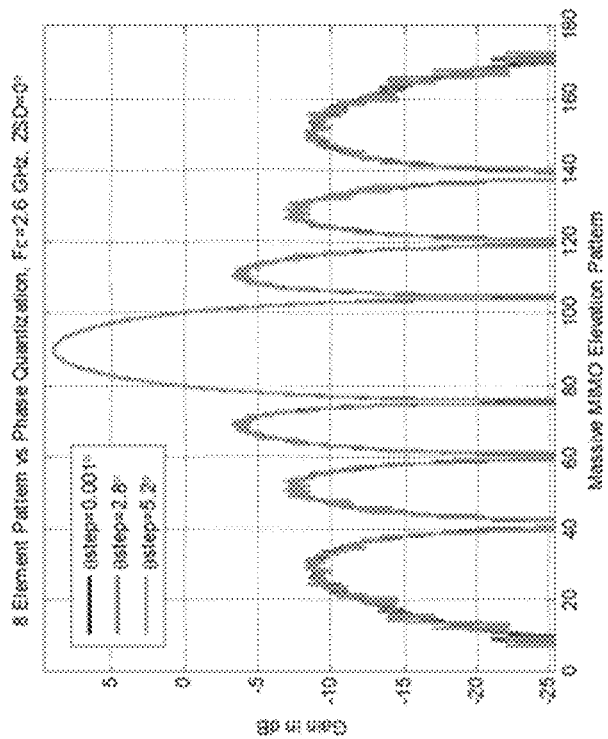

FIG. 8A depicts the effect of quantization noise to the beam former in LOS case and FIG. 8B depicts the effect of quantization noise to the beam former in the NLOS propagation case. For the NLOS condition, an angle spread of 2 degrees is shown to fill in the pattern nulls and reduce the sensitivity to phase step quantizing, since the angle spread is essentially an averaging window that is applied to the expected array factor. Even though the phase matrix is controlled in discrete steps, the performance is very close to a continuous phase beam forming, as shown in the simulation results in FIG. 8A and FIG. 8B. This result holds for much larger numbers of array elements, as well. Results have been measured and compared to theoretical expectations for a classical beamforming example using a 16 element uniform linear array (ULA) with 0.5λ element spacing, and programmable radio phase shifter splitting and combining matrix 24 programmed with the phase given by $$\phi_i = \frac{2\pi d_i}{\lambda} \sin(\theta)$$

where di is the element spacing and θ is the angle of departure (AoD), to emulate an array response.

Before the disclosed methods and systems can be used, phase calibration is needed to ensure the correct position in 3D of each virtual cluster. The process of phase calibration begins by disabling all links from input to outputs. Then, each possible link is enabled on an individual basis using switch box 242. The phase is measured with the aid of vector network analyzer (VNA) 205 and entered into data store 275.

The phase and amplitude calibration of a signal generation path that emulates interaction between a massive MIMO antenna array and a MIMO mobile unit includes path-by-path phase calibration of programmable radio phase shifter and combining matrix 244 (PSM) that passes multiple channels of signals through a channel emulator, without using the channel emulator to mix channels. The PSM passively shifts phase of each radio signal input routed to each radio signal output, according to input paired to output phase parameters, and passively attenuates each radio signal input routed to each radio signal output, according to input paired to output attenuation parameters. Then the calibration process includes adjusting input amplitude using the channel emulator in an amplitude equalization mode to reduce the amplitude difference to within a predetermined spread; and then path-by-path phase calibration of the channel emulator while the channel emulator is in the amplitude equalization mode.

Figure 6:
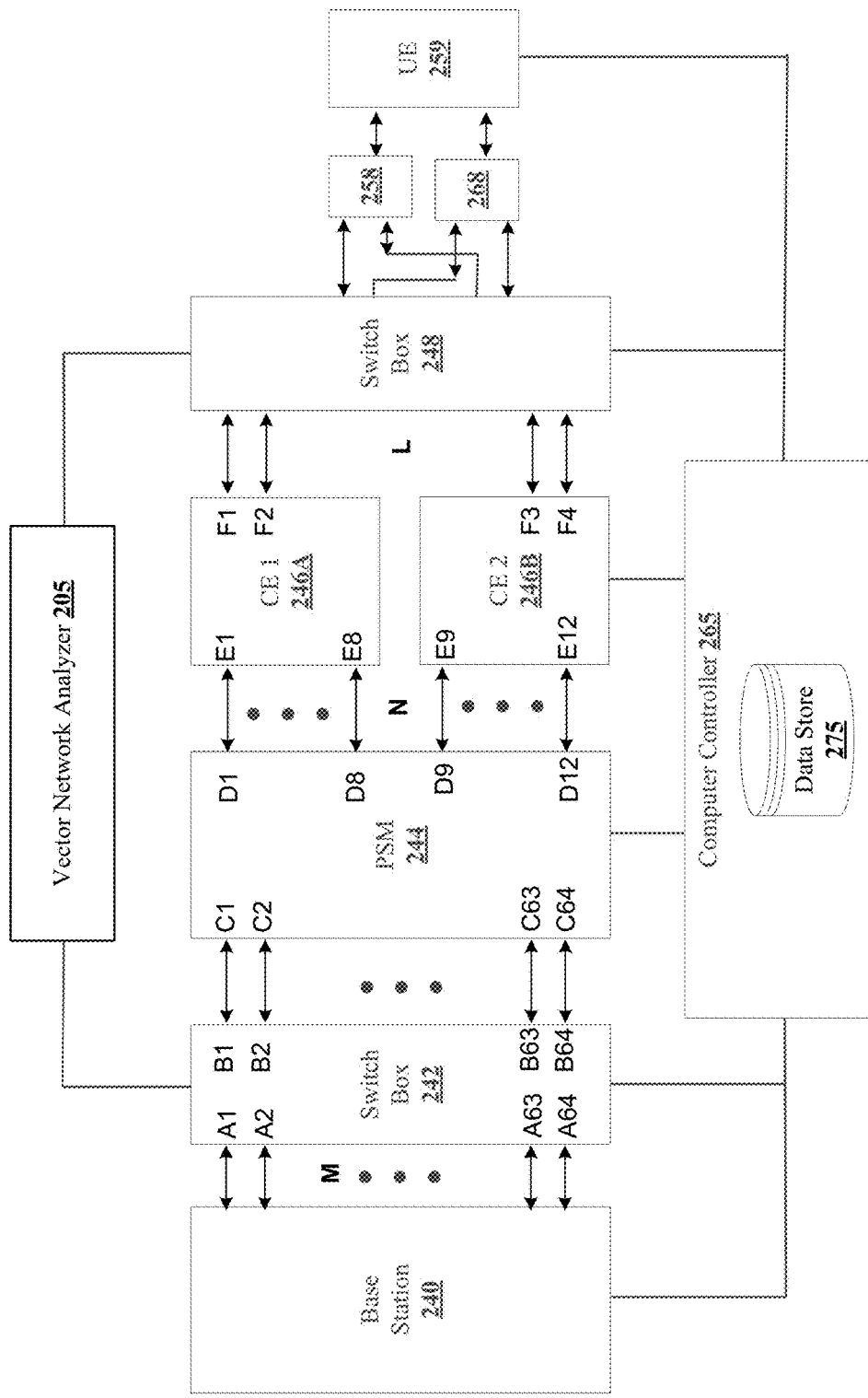
FIG. 6 shows a block diagram for calibration.

FIG. 6 shows a block diagram for calibration. In a more detailed example, the following steps are usable for calibrating PSM 244. First create a link budget to set the CE 246A, 246B input powers appropriately. Then CE input power will be equal to VNA 205 power-switch box insertion loss—RF matrix single path insertion loss. If this value is below −50 dBm, set the input power to −50 dBm. Next, set the outputs of CE 246A, 246B to −20 dBm to attain the best SNR in phase measurements. Set the VNA span to 1 MHz, and apply averaging. This can be done by the instrument, or it can be done with software by processing the measured samples. Next, begin phase calibration of the RF matrix PSM 244 by enabling each radio link path individually, and measuring the phase for that link. For example, switch to link path A1-B1-C1-D1-E1-F1 and measure phase for that link; then enable path A1-B2-C2-D1-E1-F1 and measure the phase for that link. Continue through the remaining link paths, with the same process. After completing all of the input paths, one at a time, complete the measured calibration for the first CE input by adding a delta phase to each path in order to create a phase match to a reference phase. Repeat the process described until all CE inputs are calibrated. The number of CE inputs depends on the number of clusters to be emulated and the number of UEs in the system.

Continue with the following steps for calibrating: use switch box 242 to route the signal of VNA 205 in continuous wave mode, to all RF matrix inputs. Autoset the CE 246A, 246B inputs to correct any amplitude imbalance of the PSM 244 RF matrix and execute input phase calibration. The CE needs to have a default channel propagation condition.

At the end of the process, a first radio link is chosen as the reference, and all of the other links add the corresponding phase that makes them coherent with the reference. For the calibration system presented in FIG. 6, the gNodeB base station 240 has M=64 ports, the PSM 244 RF Matrix has N=12 output ports, and the CE has L=4 outputs ports.

Emulating the MIMO channel is done with radio channel emulators 246 which supply spatial and temporal correlation to many predefined propagation paths. Numerous channel model proposals are being discussed in standards, which models could be utilized to define the number of spatial clusters observed by the massive MIMO array, given the array resolution and bandwidth that is available to observe the channel. Therefore, channel models will be selected based on the ability of the array to utilize them. The virtual probe allows a single path to be modeled, and additional virtual probes will enable spatial angle spread and multipath to be emulated. The virtual probe will be connected on one side of the channel emulator, and the UE connections will be on the other. Bi-directional paths will be utilized within the channel emulator and within the phase matrix.

Figure 9:
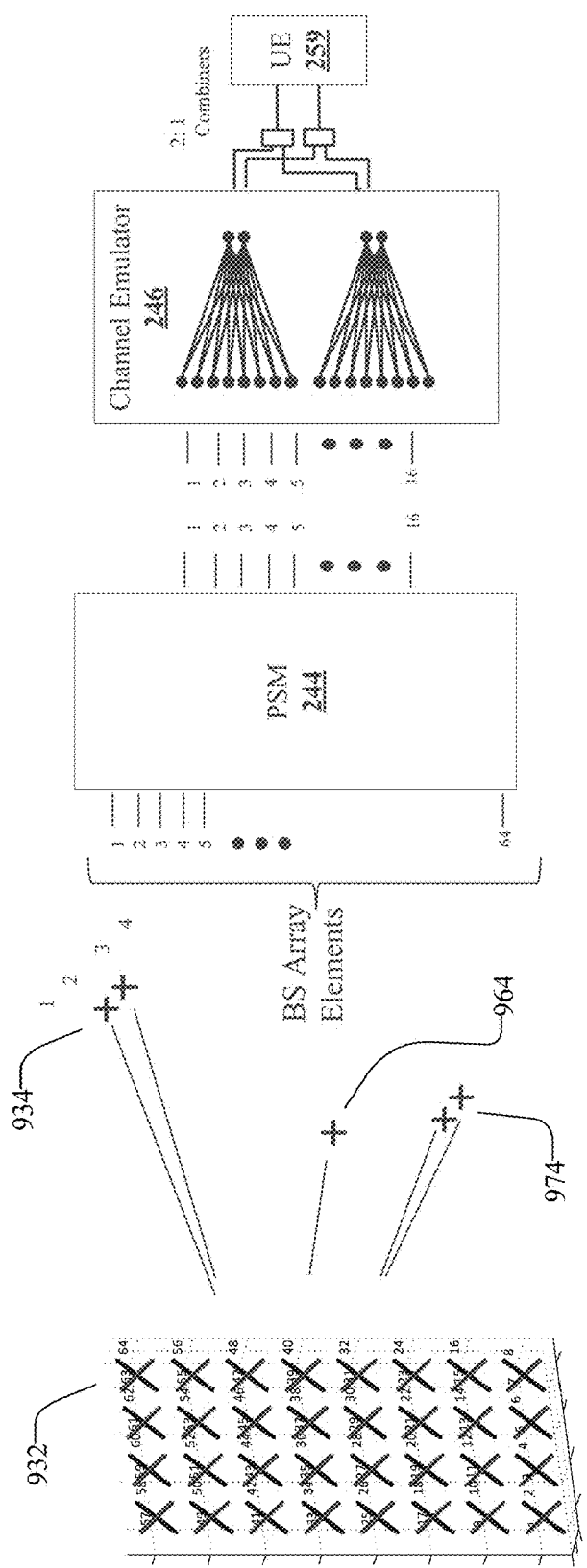
FIG. 9 shows an example system for constructing virtual probe signals that represent line-of-sight and multi-pathing.

FIG. 9 shows an example system for constructing virtual probe signals that represent line-of-sight and multi-pathing between a base station represented by antenna array 932 and user equipment (UE) 259, consistent with the channel model. A single path 964 can be emulated by programming the phase table of PSM 244 with 64 inputs to one output. Each output can emulate a virtual probe. Two outputs can emulate a dual polarized virtual probe 974 which can emulate a LOS cluster and two dual polarized probes 934 with a given spacing can emulate a NLOS cluster.

The process of generating phases that correspond to an array response for each path is repeated to generate a table of phases, with the number of rows equal to the number of base station (BS) array elements and the number of columns equal to the number of virtual probe elements. Each polarization is modeled by a unique virtual probe element. FIG. 10 shows an example phase array table of 64 rows and 16 columns, for constructing 16 outputs from 64 base station array elements. The phases emulate a set of path arrival/departure angles in azimuth and elevation as observed by the array under test. The phases are determined by evaluation of a far-field assumption for the planar array. Polarization information is captured by the array and the probe polarizations. Each table column represents a different virtual probe output. The phases of the array are utilized to transmit the beam from PMS.

In one test use case, the phase matrix programming can be changed very quickly, within a few seconds, to simulate movement of virtual probes to a new location, and then performing a test to learn whether the base station antenna can track the user equipment. In another test, the phase matrix programming can be updated to add or remove a cluster, modify power balance between clusters, change delays or change Doppler. That is, changes can be simulated in the propagation environment by changing the virtual probes via programming of PSM 244 and the resulting virtual probes are usable for testing.

Figures 11A, 11B:
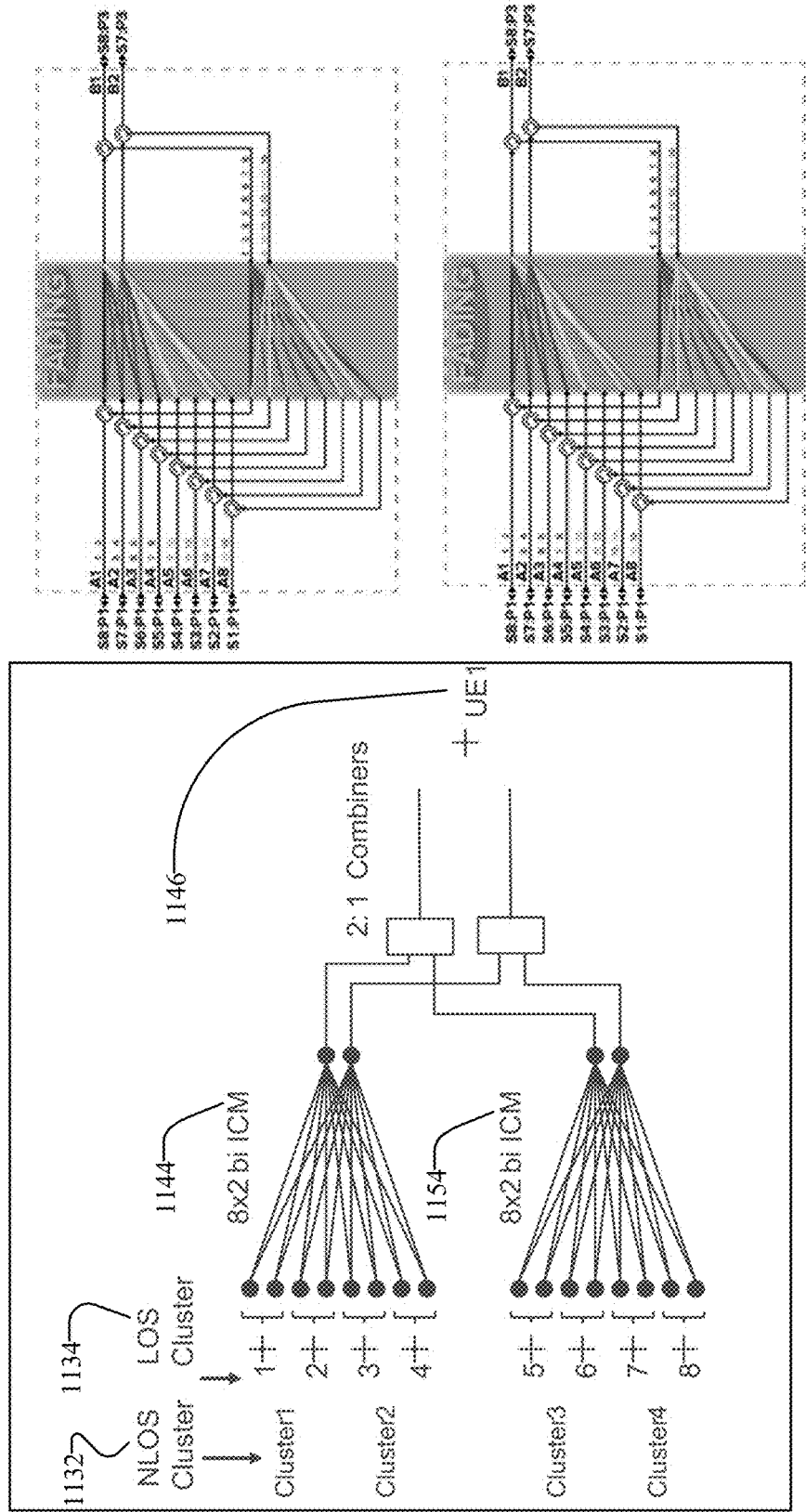
FIG. 11A shows an example system for the use case in which four NLOS clusters or eight LOS clusters beam form to a single UE.
FIG. 11B shows example CE paths with details for two 8×2 bi-directional independent channel models.

FIG. 11A shows an example system for the use case in which four NLOS clusters 1132 or eight LOS clusters 1134 beam form to a single UE 1146, through two 8×2 bi-directional independent channel models 1144, 1154. For this example case, the probes and UE are assumed to be + to + and the model may vary. Like polarizations see unit gain: vertical to vertical (V2V) and horizontal to horizontal (H2H). Cross polarizations are reduced by XPR dB—for vertical to horizontal (V2H) and horizontal to vertical (H2V) orientations. Therefore, some links are attenuated by XPR dB below the V2V and H2H unit gains. The first cluster is normalized to unit gain; additional clusters follow the power delay profile (PDP) using channel emulator relative power. Each link can support multiple taps using the same probes, which defines the spatial characteristics observed at the BS, and the UE could see unique clusters. In this example case, the tap powers see a common relative link power. Also, a NLOS cluster could support taps that include LOS clusters that are different on each probe. When summed, there is a drop in power level since some links are set below the PDP value due to XPR and weaker taps in the PDP. FIG. 11B shows details for the two 8×2 bi-directional independent channel models 1144, 1154, which are also referred to as faders. For time division duplexing (TDD), the colors represent the same channel condition in both directions. FIG. 11B shows example CE paths with colors representing bi-directional independent channels in the faders.

FIG. 12A shows another example of phase matrix beam forming with a use case in which each of four NLOS clusters 1232, 1242, 1252, 1262 are directed to a single UE 1236, 1246, 1256, 1266, through two dual 4×2 bi-directional independent channel models 1234, 1254. For this example case, the probes and UE are assumed to be + to +. FIG. 12B shows details for the two dual 4×2 bi-directional independent channel models 1234, 1254, with colors representing bi-directional independent channels in the faders.

Figure 13A:
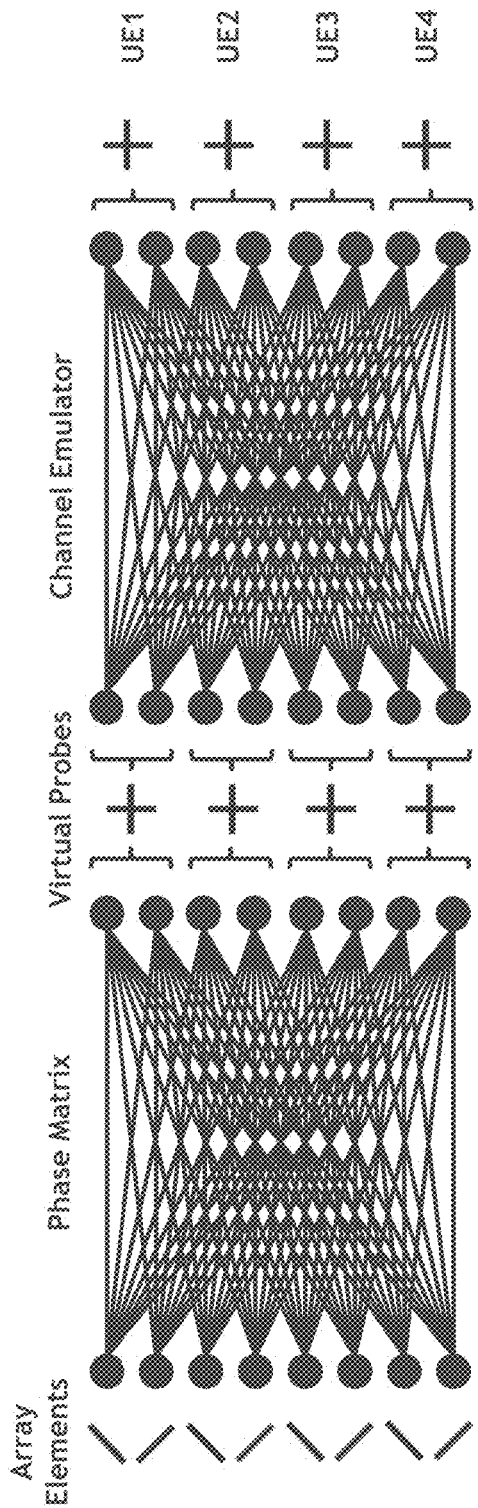
FIG. 13A illustrates the disclosed model using combined phase matrix and channel emulator for emulating signals from a massive MIMO base station transceiver to a MIMO mobile unit, as dictated by a channel model.

FIG. 13A illustrates the disclosed model using combined phase matrix and channel emulator for emulating signals from a massive MIMO base station transceiver to a MIMO mobile unit, as dictated by a channel model, and from a MIMO mobile unit to a massive MIMO base station transceiver, also as dictated by a channel model. The phase matrix, aka PSM 244, provides beamforming paths to virtual probes, emulating dual polarized probes conductively.

Figure 13B:
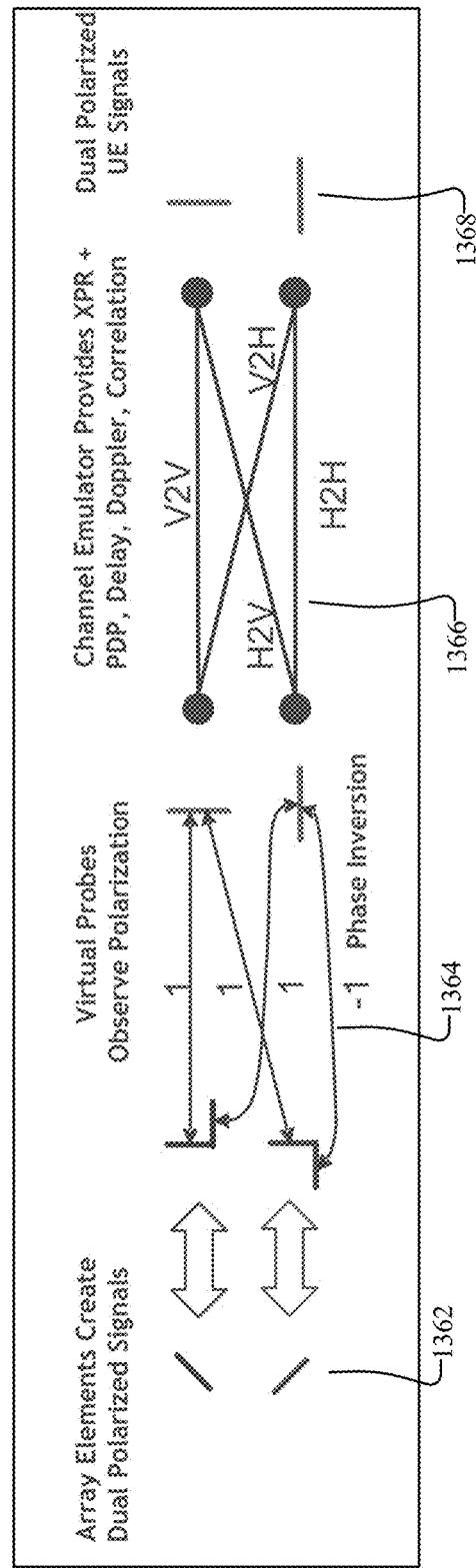
FIG. 13B shows signal orientations for the model shown in FIG. 13A.

FIG. 13B shows signal orientations: array elements create dual polarized signals 1362, virtual probes observe polarization 1364, and channel emulator provides XPR and PDP, delay, Doppler and correlation 1366, resulting in dual polarized UE signals 1368. The disclosed model is bi-directional: dual polarized UE signals can traverse the disclosed model to the massive MIMO base station transceiver, for completing testing.

Computer System

FIG. 14 is a simplified block diagram of an embodiment of a system 1400 that can be used for testing a beamforming antenna array. MIMO array testing can be implemented using a computer program stored in system memory, or stored on other memory and distributed as an article of manufacture, separately from the computer system.

Computer system 1410 typically includes a processor subsystem 1472 which communicates with a number of peripheral devices via bus subsystem 1450. These peripheral devices may include a storage subsystem 1426, comprising a memory subsystem 1422 and a file storage subsystem 1436, user interface input devices 1438, user interface output devices 1478, and a network interface subsystem 1476. The input and output devices allow user interaction with computer system 1410 and network and channel emulators. Network interface subsystem 1474 provides an interface to outside networks and devices of the system 1400. The computer system further includes communication network 1484 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 1438 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1410.

User interface output devices 1478 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non visual display such as via audio output devices. In general, use of the term "output device" is intended to include all possible types of devices and ways to output information from computer system 1410 to the user or to another machine or computer system. The computer system further can include user interface output devices 1478 for communication with user equipment.

Storage subsystem 1426 stores the basic programming and data constructs that provide the functionality of certain embodiments of the present invention. For example, the various modules implementing the functionality of certain embodiments of the invention may be stored in a storage subsystem 1426. These software modules are generally executed by processor subsystem 1472.

Storage subsystem 1426 typically includes a number of memories including a main random access memory (RAM) 1434 for storage of instructions and data during program execution and a read only memory (ROM) 1432 in which fixed instructions are stored. File storage subsystem 1436 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1436. The host memory storage subsystem 1426 contains, among other things, computer instructions which, when executed by the processor subsystem 1472, cause the computer system to operate or perform functions as described herein. As used herein, processes and software that are said to run in or on "the host" or "the computer", execute on the processor subsystem 1472 in response to computer instructions and data in the host memory storage subsystem 1426 including any other local or remote storage for such instructions and data.

Bus subsystem 1450 provides a mechanism for letting the various components and subsystems of computer system 1410 communicate with each other as intended. Although bus subsystem 1450 is shown schematically as a single bus, alternative embodiments of the bus subsystem may use multiple busses.

Computer system 1410 itself can be of varying types including a personal computer, a portable computer, a workstation, a computer terminal, a network computer, a television, a mainframe, or any other data processing system or user device. Due to the ever changing nature of computers and networks, the description of computer system 1410 depicted in FIG. 14 is intended only as a specific example for purposes of illustrating embodiments of the present invention. Many other configurations of computer system 1410 are possible having more or less components than the computer system depicted in FIG. 14.

SOME PARTICULAR IMPLEMENTATIONS

In one implementation the disclosed technology includes a method of phase and amplitude calibration of a signal generation path that emulates interaction between a massive MIMO antenna array and a MIMO mobile unit. This method includes calibration of programmable radio phase shifter and combining matrix (abbreviated PSM, for phase shifter matrix) in series with a channel emulator. The PSM calibration method includes path-by-path phase calibration of multiple channels of signals that are passed through a channel emulator and onto antennas of the MIMO mobile unit. The PSM calibration is performed straight-through on individual active channels without using the channel emulator to mix active channels. The PSM passively shifts phase of each radio signal input routed to each radio signal output, according to input-paired-to-output phase parameters, and passively attenuates each radio signal input routed to each radio signal output, according to input-paired-to-output attenuation parameters. In this context, passively refers to the PSM not having active amplifier components.

The method proceeds with adjusting input amplitude using the channel emulator in an amplitude equalization mode to reduce the amplitude difference to within a predetermined spread. Path-by-path phase calibration of the channel emulator is then performed while the channel emulator is in the amplitude equalization mode.

After sequential equalization, the calibrated system has a known phase performance that can be used to combine coherent signals with phase differences and use the combined signals for testing.

In some implementations, the channel emulator calibration does not require amplitude equalization to support calibration, and so the sequential phase equalization does not involve any amplitude equalization mode.

A vector network analyzer (abbreviated VNA) can be used to characterize the signals during the path-by-path phase calibration of the PSM. Or, an RF network analyzer can be used.

The path-by-path phase calibration of the PSM can be performed without adjusting the channel emulator to balance amplitudes. Similar attenuation or gain can be applied by the channel emulator for all active paths, during the path-by-path phase calibration of the PSM, without equalization.

In some implementations, the multiple channels of signal represent signals presented to antenna elements in an antenna array, which are organized pair wise. The antenna element pairs further have differing polarizations that are essentially orthogonal. The method further includes constructing the virtual probes taking into account interaction between signals having the differing polarizations.

Method implementations of the calibration technology disclosed can be practiced by a system including a processor and memory, coupled to the processor, the memory holding computer program instructions that, when executed on the processor, implement any of the calibration methods disclosed.

A system can further include a pair of switches. One of the switches is between massive MIMO base station transceiver and the PSM. The other is between the channel emulator and a MIMO mobile unit. The switches can be useful in directing signals to a measuring device, such as a VNA or RF network analyzer, for use in calibration.

Method implementations of the calibration technology disclosed can be practiced using a non-transitory computer readable memory including computer program instructions loaded into the memory that, to be executed by computer hardware.

The technology disclosed is used for two way communications between a base station antenna array and one or more MIMO mobile units. To improve clarity, we describe communications in one direction and then the other, beginning with base station to mobile unit.

One method implementation of technology disclosed emulates for testing signals from a massive MIMO base station transceiver to a MIMO mobile unit as dictated by a channel model. In this context, massive refers to between 32 and 2000 individually driven elements in an antenna array connected to the "massive" MIMO base station transceiver. Of course, not all channels need to be tested at the same time.

Practicing this method, at a programmable radio phase shifter and combining matrix (abbreviated PSM, for phase shifter matrix), conductively receiving antenna element driver signals from a massive MIMO base station transceiver and constructing virtual probe signals that represent line-of-sight and multi-pathing from an antenna array of the massive MIMO base station transceiver to a MIMO mobile unit, as dictated by the channel model.

Then, at a channel emulator, combining and applying spatial and temporal correlation to the virtual probe signals for conductive transmission to the mobile unit, thereby implementing the channel model.

The PSM constructs the virtual probe signals from the antenna element driver signals by applying phase shifting and attenuation functions and combining the phase shifted and attenuated driver signals to produce the virtual probe signals at PSM outputs. The method includes conductively relaying channel emulator outputs to antennas of the MIMO mobile unit.

The method can be used to implement various channel models, including a WINNER (wireless world initiative new radio) channel model, a SCM (spatial channel model) or SCME channel model, or an IMT-Advanced channel model. Models described as WINNER models are identified as WINNER, WINNER II and WINNER+. These models can include scenarios for urban, rural, indoors, pedestrian, vehicular and other environments. The can cover a wide scope of propagation scenarios and environments, including indoor-to-outdoor, outdoor-to-indoor, bad urban micro-cell, bad urban macro-cell, feeder link base station (BS) to fixed relay station (FRS), and moving networks BS to mobile relay station (MRS), MRS to mobile station (MS). Further description of channel models can be found in documents such as Darbari, Chapter 5, MIMO Channel Models, in Miron (ed.), Signal processing (March 2010); Heino, D5.3: WINNER+Final Channel Models (v 1.0, June 2010); and Kyosti, D1.1.2 V1.1, WINNER II Channel Models (November 2007).

In the PSM, the method disclosed can include distributing the antenna element driver signals through first power dividers to phase shifters and then combining phase shifted signals through second power dividers to the PSM outputs. Such capabilities are available in PSMs available from vendors such as Top Young, Haojin Tech and Macom.

Practicing this technology the antenna element driver signals represent signals presented to elements of the antenna array. The antenna elements can be organized pair wise, with antenna element pairs having different polarizations that are essentially orthogonal. The method can further include constructing the virtual probes taking into account interaction between signals having the differing polarizations.

The method can be extended to a system including a processor and memory, coupled to the processor, a PSM coupled in communication with the processor and a channel emulator coupled in communication with the processor. In such a system, the memory holds computer program instructions that, when executed on the processor, implement any of the methods disclosed.

This system can further include a pair of switches, one positioned between the massive MIMO base station transceiver and the PSM and the other between the channel emulator and a MIMO mobile unit. These switches can be used during calibration or system verification.

Method implementations of the upstream and downstream technology disclosed can be practiced using a non-transitory computer readable memory including computer program instructions loaded into the memory that, to be executed by a system including a processor, memory, a PSM and a channel emulator.

The technology also can be described in the mobile to BS signal propagation direction. In this direction, a method of emulating signals from a MIMO mobile unit to a massive MIMO base station transceiver, as dictated by a channel model includes, at a channel emulator, conductively receiving outputs of the MIMO mobile unit and then applying spatial and temporal correlation to separate combined outputs from the MIMO mobile unit as dictated by the channel model, thereby forming virtual probe signals that represent line-of-sight and multi-pathing transmission from the MIMO mobile unit to base station antenna elements.

At a programmable radio phase shifter and combining matrix (abbreviated PSM, for phase shifter matrix), the method includes decomposing the virtual probe signals into components that emulate responses of respective base station antenna elements to individual virtual probe signals, by applying phase and attenuation functions, and combining phase shifted and attenuated components of the virtual probe signals to produce multi-element input signals that emulate responses of the respective base station antenna elements to combined virtual probe signals. Further, conductively relaying the multi-element input signals to the massively MIMO base station transceiver.

As above, the method can be applied to a variety of channel models, the description of which is not repeated here.

The PSM, distribution and combining technology described above applies in both directions of signal propagation.

As above, the method can be extended to a system including a processor and memory, coupled to the processor, a PSM coupled in communication with the processor and a channel emulator coupled in communication with the processor. In such a system, the memory holds computer program instructions that, when executed on the processor, implement any of the methods disclosed.

For purposes of this application, a computer readable media does not include a transitory wave form.

We claim as follows:

1. A method of phase and amplitude calibration of a signal generation path that emulates interaction between a massive MIMO antenna array and a MIMO mobile unit, the method including:
  path-by-path phase calibration of a programmable radio phase shifter and combining matrix (PSM) that passes multiple channels of signals through a channel emulator and onto antennas of the MIMO mobile unit, without using the channel emulator to mix channels;
  wherein the PSM passively shifts phase of each radio signal input routed to each radio signal output, according to input-paired-to-output phase parameters, and passively attenuates each radio signal input routed to each radio signal output, according to input-paired-to-output attenuation parameters;
  then adjusting input amplitude using the channel emulator in an amplitude equalization mode to reduce a difference in amplitude to within a predetermined spread; and
  then path-by-path phase calibration of the channel emulator while the channel emulator is in the amplitude equalization mode.

2. The method of claim 1, further including using a vector network analyzer (VNA) to characterize the signals during the path-by-path phase calibration of the PSM.

3. The method of claim 1, further including using an RF network analyzer to characterize the signals during the path-by-path phase calibration of the PSM.

4. The method of claim 1, further including performing the path-by-path phase calibration of the PSM before adjusting the channel emulator to balance amplitudes.

5. The method of claim 1, wherein the multiple channels of signals represent signals presented to antenna elements in an antenna array, which are organized pair wise, and antenna element pairs have differing polarizations that are essentially orthogonal, further including constructing virtual probes taking into account interaction between signals having the differing polarizations.

6. A system including:
  a processor and memory, coupled to the processor, the memory holding computer program instructions that, when executed on the processor, implement the method of claim 1.

7. The system of claim 6, further including:
  a pair of switches
  between a massive MIMO base station transceiver and the PSM and
  between the channel emulator and the MIMO mobile unit.

8. A non-transitory computer readable memory including:
  computer program instructions loaded into the memory that, when executed by computer hardware, implement the method of claim 1.

9. A method of emulating signals from a massive MIMO base station transceiver to a MIMO mobile unit as dictated by a channel model, the method including:
  at a programmable radio phase shifter and combining matrix (PSM), conductively receiving antenna element driver signals from the massive MIMO base station transceiver and constructing virtual probe signals that represent line-of-sight and multi-pathing from an antenna array of the massive MIMO base station transceiver to the MIMO mobile unit, as dictated by the channel model, and then
  at a channel emulator, combining and applying spatial and temporal correlation to the virtual probe signals for conductive transmission to the MIMO mobile unit, thereby implementing the channel model;
  the PSM constructing the virtual probe signals from the antenna element driver signals, by applying phase shifting and attenuation functions and combining the phase shifted and attenuated driver signals to produce the virtual probe signals at PSM outputs; and
  conductively relaying channel emulator outputs to antennas of the MIMO mobile unit.

10. The method of claim 9, wherein the channel model is a Winner channel model.

11. The method of claim 9, wherein the channel model is a spatial channel model extended (SCME) channel model.

12. The method of claim 9, further including, in the PSM, distributing the antenna element driver signals through first power dividers to phase shifters and then combining phase shifted signals through second power dividers to the PSM outputs.

13. The method of claim 9, wherein the antenna element driver signals represent signals presented to elements of the antenna array, which are organized pair wise, and antenna element pairs have differing polarizations that are essentially orthogonal, further including constructing virtual probes taking into account interaction between signals having the differing polarizations.

14. A system including:
  a processor and memory, coupled to the processor;
  the PSM coupled in communication with the processor;
  the channel emulator coupled in communication with the processor; and
  the memory holding computer program instructions that, when executed on the processor, implement the method of claim 9.

15. The system of claim 14, further including:
  a pair of switches
  between the massive MIMO base station transceiver and the PSM and
  between the channel emulator and the MIMO mobile unit.

16. A non-transitory computer readable memory including:
  computer program instructions loaded into the memory that, when executed by a system including a processor, memory, the PSM and the channel emulator, implement the method of claim 9.

17. A method of emulating signals from a MIMO mobile unit to a massive MIMO base station transceiver, as dictated by a channel model, the method including:
  at a channel emulator, conductively receiving outputs of the MIMO mobile unit and then applying spatial and temporal correlation to separate combined outputs from the MIMO mobile unit as dictated by the channel model, thereby forming virtual probe signals that represent line-of-sight and multi-pathing transmission from the MIMO mobile unit to base station antenna elements, and then
  at a programmable radio phase shifter and combining matrix (PSM), decomposing the virtual probe signals into components that emulate responses of respective base station antenna elements to individual virtual probe signals, by applying phase and attenuation functions, and combining phase shifted and attenuated components of the virtual probe signals to produce multi-element input signals that emulate responses of the respective base station antenna elements to combined virtual probe signals; and conductively relaying the multi-element input signals to the massive MIMO base station transceiver.

18. The method of claim 17, wherein the channel model is a Winner channel model.

19. The method of claim 17, wherein the channel model is a spatial channel model extended (SCME) channel model.

20. The method of claim 17, further including, in the PSM, distributing the virtual probe signals through first power dividers to phase shifters and then combining phase shifted signals through second power dividers to produce multi-element input signals.

21. A system including:
a processor and memory, coupled to the processor;
the PSM coupled in communication with the processor;
the channel emulator coupled in communication with the processor; and
the memory holding computer program instructions that, when executed on the processor, implement the method of claim 17.

22. The system of claim 21, further including:
a pair of switches
between the massive MIMO base station transceiver and the PSM and
between the channel emulator and the MIMO mobile unit.

23. A non-transitory computer readable memory including:
computer program instructions loaded into the memory that, when executed by a system including a processor, memory, the PSM and the channel emulator, implement the method of claim 17.

* * * * *